(12) United States Patent
Hunter

(10) Patent No.: US 6,349,477 B1
(45) Date of Patent: Feb. 26, 2002

(54) SELF ADJUSTING INCLINOMETER

(75) Inventor: Steven L. Hunter, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/431,195

(22) Filed: Nov. 1, 1999

(51) Int. Cl.[7] .............................................. G01C 9/06
(52) U.S. Cl. ................................................. 33/366.14
(58) Field of Search ........................ 33/366.11, 366.14, 33/366.15, 366.21, 366.22, 366.26

(56) References Cited

U.S. PATENT DOCUMENTS

| | | | |
|---|---|---|---|
| 3,290,786 A | * 12/1966 | Parkin | 33/366.22 |
| 3,699,510 A | 10/1972 | Lindsey | 340/18 |
| 4,085,375 A | 4/1978 | Galuschak et al. | 328/160 |
| 4,094,073 A | * 6/1978 | Parra | 33/366.14 |
| 4,430,803 A | * 2/1984 | Flanders | 33/366.14 |
| 4,503,622 A | 3/1985 | Swartz et al. | 33/366 |
| 4,521,973 A | 6/1985 | Wiklund et al. | 33/366 |
| 4,531,300 A | 7/1985 | Heidel et al. | 33/366 |
| 4,547,972 A | 10/1985 | Heidel et al. | 33/366 |
| 5,146,688 A | 9/1992 | Ito | 33/366 |
| 5,731,761 A | * 3/1998 | Sychra | 33/366.11 |

* cited by examiner

*Primary Examiner*—G. Bradley Bennett
(74) *Attorney, Agent, or Firm*—James M. Skorich; Alan H. Thompson

(57) ABSTRACT

An inclinometer utilizing synchronous demodulation for high resolution and electronic offset adjustment provides a wide dynamic range without any moving components. A device encompassing a tiltmeter and accompanying electronic circuitry provides quasi-leveled tilt sensors that detect highly resolved tilt change without signal saturation.

23 Claims, 1 Drawing Sheet

SELF ADJUSTING INCLINOMETER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to tilt sensing devices, and more particularly to metrological inclinometers.

2. Description of Related Art

Inclinometers for metrology have resolution that is about three orders of magnitude less than those employed for geophysical detection. Inclinometers or tiltmeters for geophysical studies have more resolution than required for metrology in an application such as slope stability monitoring in road cuts and road beds in slide-prone areas.

A wide range of metrology inclinometers are presently available having resolutions of 0.00005 degrees (1 microRadian). However, a need exists for an instrument that can increase the resolution of metrology inclinometers using some of the techniques employed in geophysical inclinometers, but without such complexity and are also cost effective. An object of the present invention is to provide an inclinometer for metrology having improved resolution compared to present metrology inclinometers.

SUMMARY OF THE INVENTION

The invention includes an electrical and/or electronic self-adjusting inclinometer having essentially no moving parts during the leveling of the inclinometer's tilt sensors. The inclinometer or tilt sensing system includes (1) at least one tilt sensor providing an AC analog signal obtained from exterior movement, (2) a synchronous demodulator to provide high resolution to the analog signal received from the sensor, and (3) means for providing offset to the analog signal to provide the system with a quasi-initial leveling status and also signal amplification, without saturating the signal. Some offset can be sent to the synchronous demodulator to allow greater AC gain, thus improving the signal-to-noise ratio.

The system works effectively in inclinometers having tilt sensors that were initially not level with the horizontal. Prior to detection of exterior object movement, e.g., tilt or inclination changes in earth formations, the tilt sensors are electronically quasi-leveled by employing the offset. After tilt detection by the sensor(s), the more highly resolved analog signal can be converted to digital, sent to microcomputer means where it can be stored, filtered, further sent to central collection, and/or the data monitored and/or returned to the system. If tilt changes reach a critical level, an alarm can be triggered from the microcomputer.

DETAILED DESCRIPTION OF THE INVENTION

Figure 1:
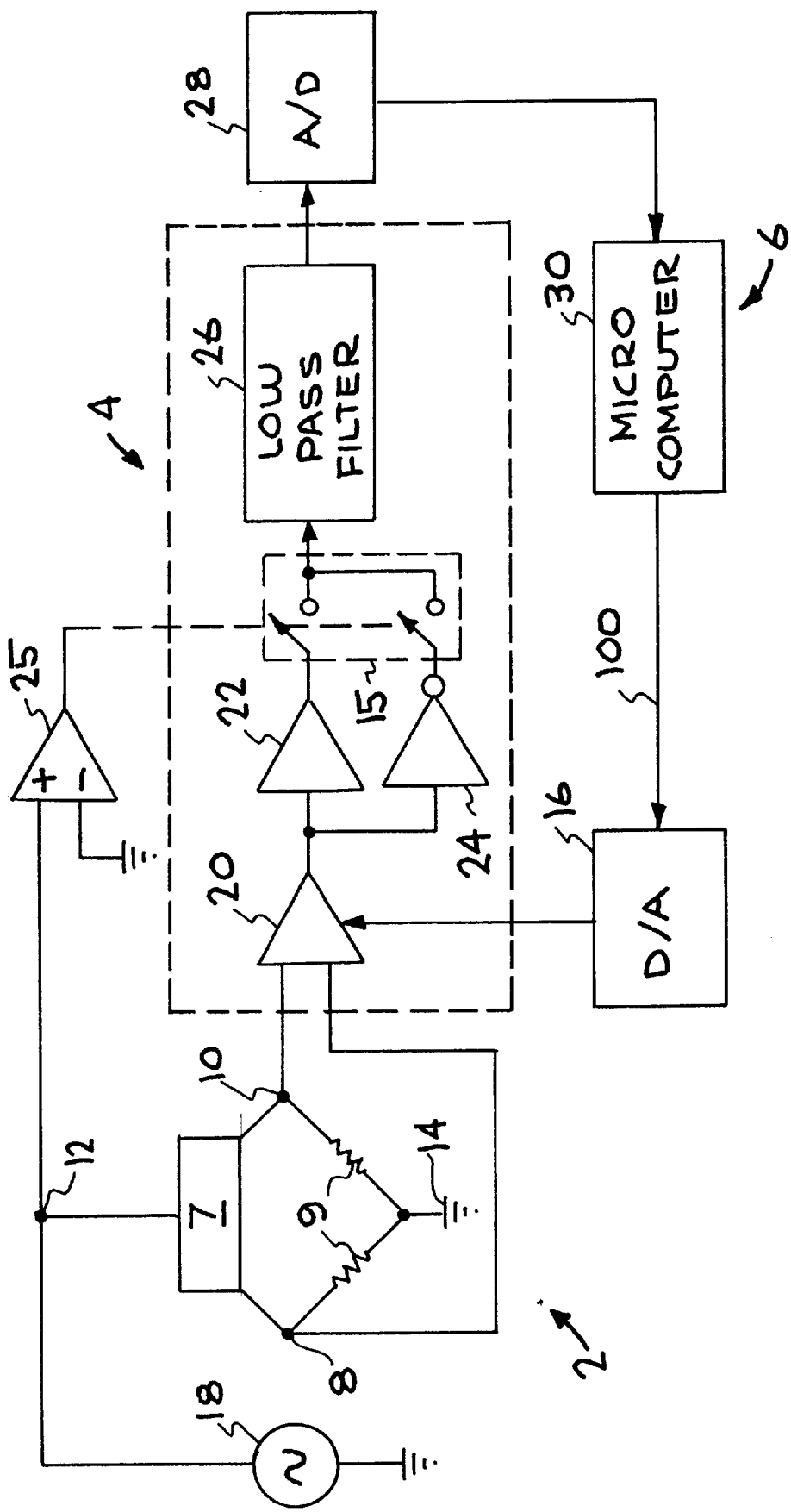
FIG. 1 illustrates a schematic diagram of a self-adjusting tilt sensing system.

The present invention includes a tilt-sensing device having at least one tilt sensor connected to electrical and/or electronic circuitry. For the device, method and use of the invention, a tilt sensor having a single longitudinal axis is described, although a 2-axis tilt sensor or others can readily be adapted to the invention by the skilled artisan. A preferred sensor is a electrolytic sensor, i.e., containing an electrolytic fluid, typically a liquid having a gas bubble, although non-bubbled fluid sensors can be utilized.

FIG. 1 illustrates a schematic diagram of a tilt sensing device of the invention having at least one tilt sensor circuit 2 connected to an amplification system such as synchronous demodulator 4 connected to offset means 16 for providing an electrical or electronic offset that can be transmitted to the amplification system (i.e., synchronous demodulator 4). The tilt sensing device encompasses one or more tilt sensors 7 (e.g., a single 1-axis electrolytic tilt sensor circuit shown) having analog output electrodes 8 and 10 adapted to detect a tilt angle (or angles) of inclination with the horizontal and to transmit an analog signal (or signals) therefrom. The tilt sensor circuit 2 can include at least one excitation electrode 12, at least one ground 14, and at least a pair of fixed resistors 9.

The device includes synchronous demodulator 4 adapted to receive the analog signal(s) from the tilt sensor(s) via electrodes 8 and 10 and to increase resolution of the analog signal(s). Synchronous demodulator 4 receives analog output signals from the sensors as well as offset from a digital-to-analog conversion means such as digital-to-analog converter 16. Oscillator 18 includes the drive circuitry for sensor(s) circuit 2 (e.g., a 10 volt peak-to-peak 2 KHz sine wave.) Oscillator 18 output signals typically range from 3 to 20 volts, peak-to-peak, at about 100 Hz to about 10 KHz. The sensor outputs are transmitted to a differential amplifier 20 (via sensor output electrodes 8 and 10, respectively). Resistors 9 complete a Wheatstone bridge with tilt sensor 7. A first amplifier 22 is capable of generating signals of equal amplitude and phase from the output of differential amplifier 20. Second amplifier 24 is capable of generating a signal of equal amplitude, but inverted with respect to the output of differential amplifier 20. Accordingly, first and second amplifiers 22 and 24 have equal gain, but opposite polarities with respect to each other. For example, first amplifier 22 can have a gain of 10 and second amplifier 24 would then have a gain of negative 10. Usually such amplifiers provide a gain from about 1 to about 1000. The drive voltage from oscillator 18 controls an analog multiplexor 15, which gates the synchronized output signals of first and second amplifiers 22 and 24 thereby demodulating and providing a synchronous rectified signal which can be filtered through low pass filter 26 to obtain a smooth output voltage proportional to the sensor tilt angle, and of positive or negative polarity, depending on the direction of tilt. The filtered output can then be coupled to analog-to-digital signal conversion means. Usually analog multiplexor 15 is controlled by the output of a comparator 25 which detects the zero crossing of oscillator 18. Thus, the comparator 25 output is logic high when the output of oscillator 18 is positive and a logic low when oscillator 18 is negative.

A feature of the device of the invention involves a means for providing an offset to the analog signal obtained from the tilt sensors. Such means for providing an offset to such an analog signal are adapted to return a portion of the offset to the synchronous demodulator and are adapted to amplify the analog signal and simultaneously prevent signal saturation. The offset is typically in the form of a voltage increase or reduction to the output analog signal from the tilt sensor, although other forms of offset adjustments should be apparent to the skilled artisan. Such means for providing the offset can include analog-to-conversion means such as a digitalto-analog signal converter 16. A computer 30 (e.g., microcomputer) is adapted to receive and/or monitor the analog signal or to receive and/or monitor a digital signal converted from the analog signal. The computer can include (or be connected to) signal conversion means such as an analog-to-digital converter 28 for converting the analog signal to an digital signal and/or a digital-toanalog converter for converting the digital signal to an analog signal. Normally the offset is transmitted from digital-to-analog converter 16 via computer 30 wherein an operator makes adjustments, or a program code is activated, to control the offset to the demodulator via analog-to-digital signal converter 16. Such an offset can also be provided by resistors (not shown) to demodulator 20.

The invention includes a method for leveling the sensing device or tiltmeter wherein a digital-to-analog converter is set to a given offset, an initial, non-level tilt angle from horizontal is measured by receiving and recording an analog output signal from the tilt sensor in the tiltmeter, and the offset is adjusted to null the analog output signal from the tilt sensor. The tiltmeter is initially positioned to measure an object of measure at the initial tilt angle other than level or horizontal, and the digital-to-analog converter is set to a relatively small or minimum offset. The amount of offset is adjusted to essentially null the analog output signal from the tilt sensor(s) by adjusting a converted analog output signal from the digital-toanalog converter to essentially null the output of the synchronous demodulator. Such an amount can be up to (plus or minus) the full scale of the amplifier or synchronous demodulator. Thus, in effect, the adjusted offset electronically produces a quasi-leveling of the initially non-level sensor(s) without any mechanical movement of components of the inventive device.

The method includes measuring a tilt change by receiving and recording a second analog output signal from the leveled tilt sensor, the second analog output signal being amplified and digitized. The digitized output signal from the second analog output signal is transmitted to the computer for monitoring, recordation, storage, and/or further amplification or demodulation.

Changes and modifications in the specifically described embodiments can be carried out without departing from the scope of the invention, which is intended to be limited by the scope of the appended claims.

What is claimed is:

1. A tilt sensing device comprising:

a tilt sensor adapted to detect a tilt angle of inclination with respect to a horizontal reference and to transmit an analog electrical signal;

a synchronous demodulator adapted to receive said analog signal and to increase resolution of said analog signal; and a computer adapted to generate an offset from said analog signal and to feed back a portion of said offset to said synchronous demodulator.

2. A tilt sensing device comprising:

a tilt sensing device adapted to detect a tilt angel of inclination with the horizontal and to transmit an analog electrical signal;

a synchronous demodulator adapted to receive said analog signal and to increase resolution of said analog signal; and means for providing an offset to said analog signal from said tilt sensing device, and for returning a portion of said offset to said synchronous demodulator.

3. The device of claim 2 wherein said means for providing an offset to said analog signal is adapted to amplify said analog signal and simultaneously prevent signal saturation.

4. The device of claim 2 further comprising a microcomputer adapted to receive said analog signal or to receive a digital signal converted from said analog electrical signal.

5. The device of claim 4 further comprising conversion means for converting to digital signal an analog signal obtained from said means for providing said offset to said analog signal.

6. The device of claim 4 wherein said microcomputer is adapted to monitor said analog signal.

7. The device of claim 2 wherein said means for providing said offset comprises a computer and a digital-to-analog converter.

8. A process for using the device of claim 2 to detect a tilt change of an object of measure.

9. A tilt sensing device comprising:

a tilt sensing device adapted to detect a tilt angle of inclination from the horizontal and to transmit an analog output signal;

a synchronous demodulator adapted to receive said analog output signal and to increase resolution of said analog output signal;

an analog-to-digital converter adapted to digitize said analog output signal and to transmit a digital output signal; and a digital-to analog converter adapted to provide offset to said synchronous demodulator.

10. The sensing device of claim 9 further comprising a computer adapted to receive said digital output signal from said analog-to-digital converter, said computer comprising a program code to control said offset.

11. The sensing device of claim 10 wherein said computer is adapted to transmit said digital output signal to said digital-to-analog converter.

12. A method for leveling a tiltmeter comprising:

setting a digital-to-analog converter to a given offset;

measuring an initial tilt angle from horizontal by receiving and recording an analog output signal from a tilt sensor in said tiltmeter;

adjusting said offset to null said analog output signal from said tilt sensor; and transmitting said offset to a synchronous demodulator.

13. The method of claim 12 wherein said tiltmeter is initially positioned at said object of measure at an initial tilt angle other than level or horizontal.

14. The method of claim 12 wherein said digital-to-analog converter is set to a minimum offset.

15. The method of claim 12 wherein said offset is adjusted to essentially null by adjusting to essentially null a converted analog output signal from a synchronous demodulator.

16. The method of claim 12 further comprising measuring a tilt change by receiving and recording a second analog output signal from a leveled tilt sensor.

17. The method of claim 16 wherein said second analog output signal is amplified and digitized.

18. The method of claim 17 wherein a digitized output signal from said second analog output signal is transmitted to a computer for monitoring, recordation, demodulation and/or storage.

19. A method for leveling a tiltmeter comprising:

electronically leveling a non-leveled tiltmeter by adding or subtracting offset to an analog output signal obtained from a tilt sensor contained in said tiltmeter; and transmitting said offset to a synchronous demodulator.

20. The method of claim 19 wherein said offset is adjusted to null said analog output signal from said tilt sensor.

21. The method of claim 20 wherein said offset comprises voltage or current.

22. A computer-usable medium embodying computer program code for causing a computer to perform self leveling of a tilt sensor by executing the steps of:

setting an electronic offset to a minimum;

receiving an output signal obtained from a tilt sensor;

adjusting said electronic offset to null said output signal from said tilt sensor, whereby
said tilt sensor is quasi-leveled; and transmitting said electronic offset to a synchonous demodulator.

23. The computer-usable medium of claim 22 further including the steps of:

receiving a second output signal obtained from a quasi-leveled tilt sensor, and controlling said electronic offset transmitted to an amplifier.

* * * * *